United States Patent
Laroche et al.

(10) Patent No.: US 10,625,202 B2
(45) Date of Patent: Apr. 21, 2020

(54) COMPOSITION AND PROCESS FOR GAS DEHYDRATION

(71) Applicant: Dow Global Technologies LLC, Midland, MI (US)

(72) Inventors: Christophe R. Laroche, Lake Jackson, TX (US); Armin Hassanzadeh, Pearland, TX (US); Eric J. Klinker, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 212 days.

(21) Appl. No.: 15/761,831

(22) PCT Filed: Oct. 3, 2016

(86) PCT No.: PCT/US2016/055099
§ 371 (c)(1),
(2) Date: Mar. 21, 2018

(87) PCT Pub. No.: WO2017/069929
PCT Pub. Date: Apr. 27, 2017

(65) Prior Publication Data
US 2018/0280868 A1 Oct. 4, 2018

Related U.S. Application Data

(60) Provisional application No. 62/243,420, filed on Oct. 19, 2015.

(51) Int. Cl.
*B01D 53/14* (2006.01)
*B01D 53/26* (2006.01)
*B01D 53/28* (2006.01)
*C10L 3/10* (2006.01)

(52) U.S. Cl.
CPC ......... *B01D 53/28* (2013.01); *B01D 53/1425* (2013.01); *B01D 53/263* (2013.01); *C10L 3/106* (2013.01); *B01D 2252/2025* (2013.01); *B01D 2252/2026* (2013.01); *B01D 2252/2028* (2013.01); *B01D 2252/50* (2013.01); *B01D 2252/504* (2013.01); *B01D 2252/604* (2013.01); *B01D 2252/606* (2013.01); *B01D 2252/608* (2013.01); *B01D 2256/245* (2013.01); *C10L 2290/08* (2013.01); *C10L 2290/12* (2013.01); *C10L 2290/541* (2013.01)

(58) Field of Classification Search
CPC .... B01D 2252/2025; B01D 2252/2026; B01D 2252/2028; B01D 2252/50; B01D 2252/504; B01D 2252/604; B01D 2252/606; B01D 2252/608; B01D 2256/245; B01D 53/1425; B01D 53/263; B01D 53/28; C10L 2290/08; C10L 2290/12; C10L 2290/541; C10L 3/106
See application file for complete search history.

(56) References Cited

U.S. PATENT DOCUMENTS 5,853,458 A * 12/1998 Gavlin ............... B01D 53/1493
95/231

* cited by examiner

*Primary Examiner* — Cabrena Holecek

(57) ABSTRACT

The present invention relates to a dehydration composition and method of use thereof for drying gas streams, in particular natural gas streams, wherein the dehydration composition comprises (i) a glycol, (ii) a borate compound, (iii) an alkali metal carboxylate, and (iv) an additional glycol different than (i), and/or (v) an additional additive selected from an alkanolamine, a phosphate acid or salt compound, a sweetening agent, a low temperature viscosity improver, a corrosion inhibitor, an antifoaming agent, or mixtures thereof.

11 Claims, No Drawings

COMPOSITION AND PROCESS FOR GAS DEHYDRATION

FIELD OF THE INVENTION

The present invention relates to a composition and method of use thereof for drying gas streams, in particular natural gas streams, wherein the composition comprises triethylene glycol. Said triethylene glycol compositions are particularly suitable for dewatering gas streams comprising water.

BACKGROUND OF THE INVENTION

Gases, such as natural gas, generally contain varying amounts of water vapor. It is desirable that no water vapor be admitted to a natural gas pipeline. The presence of the water vapor is undesirable as the water vapor can result in corrosion of pipes and cause corrosion of, and stoppages in, valves and fittings in gas pipe transmission systems. Further, quantities of water or moisture that are relatively small may freeze and block the pipeline such that flow is completely halted or at least greatly restricted.

A common method for removing moisture from gas streams, such as natural gas, is to use a gas dehydration unit using a glycol as a solvent. In such a unit, the wet gas is contacted with a lean drying agent solution, such as a glycol, in an absorbent step to remove the water. The glycol commonly used is triethylene glycol (TEG) and to a lesser extent other glycols such as diethylene glycol (DEG) or ethylene glycol (EG). The rich glycol (i.e., glycol containing the water) is then passed to a reconcentration or regeneration process typically comprising a reboiler wherein the absorbed water is driven off and removed, thereby enabling reuse of the regenerated glycol.

A troublesome problem arises herein, however, in that, simple heating of the drying agent may not remove a sufficient amount of water. The efficiency of the gas drying operation is a function of the residual water in the regenerated dehydrating agent. Raising the temperature during regeneration tends to drive off more moisture, but the use of excess heat also promotes degradation of the dehydrating agent by formation of pyrolysis products. These pyrolysis products in turn further reduce the effectiveness of the dehydrating agent.

Furthermore, such pyrolysis products may produce acids which may create corrosion problems in the gas dehydration units. To combat corrosion, drying agent compositions may comprise corrosion inhibitors, such as an alkanolamine. Commonly employed alkanolamines are, for example, monoethanolamine, diethanolamine, triethanolamine, etc. However, alkanolamines may be volatile and/or thermally unstable at dehydration reboiler temperatures.

Therefore, there still exists a need for a drying agent solution with improved thermal stability having corrosion inhibition properties.

SUMMARY OF THE INVENTION

The present invention is a dehydration composition and process for removing water from a gas comprising water using a gas dehydration composition comprising, essentially consisting of, or consisting of: i from 60 to 99.9 weight percent of a glycol, ii from 0.1 to 10 weight percent of a borate compound, iii from 0.01 to 10 weight percent of an alkali metal carboxylate, iv from 0 to 30 weight percent of an additional glycol different than i, and v from 0 to 25 weight percent of an additional additive selected from an alkanolamine, a phosphate acid or salt compound, a sweetening agent, a low temperature viscosity improver, a corrosion inhibitor, an antifoaming agent, or mixtures thereof wherein weight percents are based on the total weight of the dehydration composition.

In one embodiment of the present invention, in the dehydration composition disclosed herein above, the glycol is monoethylene glycol, diethylene glycol, triethylene glycol, tetraethylene glycol, monopropylene glycol, dipropylene glycol, tripropylene glycol, tetrapropylene glycol, or glycerol, preferably triethylene glycol, the borate compound is boric acid, metaboric acid, sodium metaborate, tetraboric acid, sodium tetraborate, potassium tetraborate, their corresponding hydrates, or mixtures thereof, or mixtures thereof, preferably sodium tetraborate, the alkali metal salt is sodium acetate, potassium acetate, sodium formate, potassium formate, sodium bicarbonate, potassium bicarbonate, sodium glycolate, potassium glycolate, sodium lactate, potassium lactate, their corresponding hydrates, or mixtures thereof, preferably sodium acetate, and the additional glycol is monoethylene glycol, diethylene glycol, triethylene glycol, tetraethylene glycol, monopropylene glycol, dipropylene glycol, tripropylene glycol, tetrapropylene glycol, glycerol, or mixtures thereof.

In one embodiment of the process of the present invention, the gas is natural gas.

In another embodiment the process of the present invention comprises the step of (a) contacting said gas in a continuous counter current contact zone with said dehydrating composition, preferably further comprising the steps (b) regenerating said water-rich dehydrating composition at a temperature of 120° C. to 225° C. to form a lean dehydration composition and (c) using all or part of the regenerated lean dehydration composition, repeat step a.

DETAILED DESCRIPTION OF THE INVENTION

The dehydration compositions of the present invention may be used to remove water from any gas comprising water, they are particularly suited for removing water from any gas comprising water, and are particularly suited for use with raw and/or treated natural gas. Raw natural gas comes from three types of wells: oil wells, gas wells, and condensate wells. Natural gas that comes from oil wells is typically termed "associated gas". This gas can exist separate from oil in the formation (free gas), or dissolved in the crude oil (dissolved gas). Natural gas from gas and condensate wells, in which there is little or no crude oil, is termed "non-associated gas". Gas wells typically produce raw natural gas by itself, while condensate wells produce free natural gas along with a semi-liquid hydrocarbon condensate. Whatever the source of the natural gas, once separated from crude oil (if present) it commonly exists as a mixture of methane and other hydrocarbons, water, salts, and other impurities, such as acid gases. The term "natural gas" as used herein below includes any natural gas source comprising water including raw or treated natural gas. Treated natural gas is raw natural gas that has been treated one or more times to remove one or more impurities.

The process of dehydrating a gaseous fluid using a glycol is well known in the art, such as is described by the processes in U.S. Pat. No. 2,988,171 and Kohl et al., "Gas Purification" 4$^{th}$ Edition, 1985, Gulf Publishing Company. However, it will be apparent to those skilled in the art that such a counter-current system could be used for drying other gases as well. These known processes can be used with the dehydrating compositions of the present invention. Preferably, the gas is contacted with the dehydrating composition in a continuous counter-current flow process. When the gaseous fluid is natural gas, the process generally passes the gas into the bottom of an absorber unit, equipped with baffles, trays, random packing, structured packing, or combination thereof, where the gas is contacted counter-currently in the contact zone with a lean dehydrating composition to remove the water. The dry gas exits the top of the absorber unit and the rich dehydrating composition is removed from the bottom of the absorber unit and pumped to a series of heat exchanges or to a flash tank or larger units. After the flash tank, or directly from the smaller absorber units, the rich dehydrating composition passes through a series of heat exchangers and filters before going to a still and regenerator, where water is stripped from the dehydrating composition.

The temperature and pressure of the gas to be dehydrated can have an effect on the process of this invention. For example, for natural gas containing primarily methane, the temperature of the gas to be dehydrated will usually be within the range of about 20° C. to 45° C., having been reduced from higher temperatures when discharged from its underground source. Pressure during dehydration is usually increased to between about 500 to 1,000 psi. At this temperature, the gas will contain about 0.5 to 5 percent by weight of water.

Water-rich dehydration composition of the present invention is pumped through a closed-loop (of which the absorber is part) including various filters, strippers, heat exchangers, etc., and a reboiler wherein the water-rich dehydration composition of the present invention is conventionally heated and maintained at a temperature of from 150° C. to about 225° C., preferably at a temperature from 170° C. to 220° C., such that the water is driven off. All or part of the resulting lean regenerated dehydration composition of the present invention may then be returned through the remaining portion of the loop back to the absorber, again to flow in countercurrent exchange with natural gas comprising water.

In one embodiment, a dehydrating composition used in the present invention comprises one or more glycol, a borate compound (ii), and an alkali metal carboxylate (iii).

In another embodiment, a dehydrating composition used in the present invention consists essentially of one or more glycol, a borate compound (ii), and an alkali metal carboxylate (iii).

In yet another embodiment, a dehydrating composition used in the present invention consists of one or more glycol, a borate compound, and an alkali metal carboxylate.

The glycols usually employed as component (i) are mono-, di-, tri-, and tetraethylene glycol and mono-, di-, tri-, and tetrapropylene glycol. Penta- and hexaethylene glycol and penta- and hexapropylene glycol may be employed, however; the higher glycols have higher viscosities making them less suitable for the present application. In addition, higher glycols may co-absorb higher concentration of hydrocarbon which could be detrimental during the dehydration of a stream of methane, ethane, or propane. Preferably the glycol is selected from triethylene glycol, ethylene glycol (monoethylene glycol), diethylene glycol, tripropylene glycol, or mixtures thereof. The more preferred glycol is triethylene glycol. The glycol is present in an amount from 60 to 99.9 weight percent based on the total weight of the dehydration composition. Preferably, the glycol is present in the dehydration composition in an amount equal to or greater than 60 weight percent, more preferably equal to or greater than 70 weight percent, more preferably equal to or greater than 80 weight percent, and even more preferably equal to or greater than 85 weight percent based on the total weight of the dehydration composition. Preferably, the glycol is present in the dehydration composition in an amount equal to or less than 99.9 weight percent, more preferably equal to or less than 99.5 weight percent, more preferably equal to or less than 99 weight percent, more preferably equal to or less than 95 weight percent, and even more preferably equal to or less than 90 weight percent based on the total weight of the dehydration composition.

The borate compound useful in the dehydration compositions of the present invention can be any salt of boric acid which is in the dehydration composition including alkali metal metaborates and tetraborates. Useful borates include boric acid, metaboric acid, sodium metaborate, tetraboric acid, sodium tetraborate, potassium tetraborate, and their corresponding hydrates. The borate compound is employed in amounts to provide from 0.05 to 10 weight percent borate ion based on the total weight of the dehydration composition. Preferably, the borate compound is present in the dehydration composition in an amount of equal to or greater than 0.05 weight percent, more preferably equal to or greater than 0.1 weight percent, more preferably equal to or greater than 0.2 weight percent, and even more preferably equal to or greater than 0.4 weight percent based on the total weight of the dehydration composition. Preferably, the borate compound is present in the dehydration composition in an amount equal to or less than 10 weight percent, more preferably equal to or less than 5 weight percent, more preferably equal to or less than 4 weight percent, and even more preferably equal to or less than 3 weight percent based on the total weight of the dehydration composition.

The dehydration composition of the present invention further contains an alkali metal carboxylate (iii). Suitable alkali metal carboxylates are sodium acetate, potassium acetate, sodium formate, potassium formate, sodium bicarbonate, potassium bicarbonate, sodium glycolate, potassium glycolate, sodium lactate, or potassium lactate as well as their hydrates, with sodium acetate preferred. The alkali metal carboxylate (iii) is present in the dehydration composition of the present invention in an amount of 0.01 to 10 weight percent based on the total weight of the dehydration composition. If present, the alkali metal carboxylate (iii) is present in the dehydration composition in an amount equal to or greater than 0.01 weight percent, more preferably equal to or greater than 0.05 weight percent, more preferably equal to or greater than 0.1 weight percent, and even more preferably equal to or greater than 0.2 weight percent based on the total weight of the dehydration composition. The alkali metal carboxylate (iii) is present in the dehydration composition in an amount equal to or less than 10 weight percent, more preferably equal to or less than 7.5 weight percent, more preferably equal to or less than 5 weight percent, more preferably equal to or less than 2.5 weight percent, and even more preferably equal to or less than 2 weight percent based on the total weight of the dehydration composition.

The dehydration composition of this invention can contain a minor amount of one or more glycol (iv) different from glycol (i) provided that the presence of the other glycol(s) do not adversely affect the useful temperature range or thermal stability of the dehydration composition. Suitable additional glycols are monoethylene glycol, diethylene glycol, triethylene glycol, monopropylene glycol, tetraethylene glycol, pentaethylene glycol, and glycerol. If present, the one or more glycol (iv) is present in the dehydration composition in an amount equal to or greater than 0.1 weight percent, more preferably equal to or greater than 1 weight percent, more preferably equal to or greater than 2 weight percent, and even more preferably equal to or greater than 5 weight percent based on the total weight of the dehydration composition. If present, the one or more glycol (iv) is present in the dehydration composition in an amount equal to or less than 30 weight percent, more preferably equal to or less than 25 weight percent, more preferably equal to or less than 20 weight percent, and even more preferably equal to or less than 15 weight percent based on the total weight of the dehydration composition.

The pH of the dehydration compositions of this invention, whether a concentrate or diluted fluid, must be controlled for purposes of corrosion protection. The compositions should have a pH of equal to or greater than 7 to equal to or less than 11. Preferably the dehydration composition of the present invention has a pH of equal to or greater than 7, more preferably equal to or greater than 7.5, more preferably equal to or greater than 8. Preferably the dehydration composition of the present invention has a pH of equal to or less than 11, more preferably equal to or less than 10, more preferably equal to or less than 9.

Control of the pH is provided by appropriate adjustment of the borate compound within the ranges specified herein, the borate acting as a buffer to maintain the pH within the desired range.

The dehydration composition of the present invention may further comprise one or more additional component (v) including, but not limited to: an alkanolamine, such as monoethanolamine (MEA), diethanolamine (DEA), methyldiethanolamine (MDEA), or triethanolamine (TEA), see U.S. Pat. No. 3,349,544 which is incorporated by reference herein in its entirety; a phosphate acid or salt compound, such as phosphoric acid, potassium phosphate, dipotassium phosphate, disodium phosphate, or trisodium phosphate, see U.S. Pat. No. 2,384,553 which is incorporated by reference herein in its entirety; a sweetening agent, such as a sulfolane, ethers of polyethylene glycol; a low temperature viscosity improver, for example propylene carbonate, dimethylformamide or N-substituted morpholine compounds; an antifoaming agents, for example silicone based defoamers and EO/PO based defoamers such as polysiloxane and polypropylene glycol copolymers, or a corrosion inhibitor. If present, these ingredients are used independently in an amount of from 0.01 weight percent to 25, preferably 0.1 to 10 weight percent based on the total weight of the dehydration composition.

EXAMPLES

The dehydration compositions of the present invention comprise one or more of the following:
"TEG" is triethylene glycol available from Alfa Aesar at 99% purity;
"GLY" is glycerol available from Fisher certified ACS;
"B(OH)$_3$" is boric acid available from Sigma Aldrich at 99.5% purity,
"Na$_2$B$_4$O$_7$" is sodium tetraborate available from Sigma Aldrich at 99% purity,
"NaAc" is sodium acetate available from Sigma Aldrich at 99% purity,
"NaFor" is sodium formate available from Sigma Aldrich at 99% purity,
"NaGly" is sodium glycolate available from Sigma Aldrich at 99% purity,
and
"NaLac" is sodium lactate available from Sigma Aldrich at 99% purity, The compositions for Comparative Examples A to F and Examples 1 to 7 are shown in Table 1, amounts are in weight percent based on the total weight of the dehydration compositions.

TABLE 1

| Com. Ex. | Ex. | TEG | GLY | Na$_2$B$_4$O$_7$ | NaAc | B(OH)$_3$ | NaFor | NaGly | NaLac |
|---|---|---|---|---|---|---|---|---|---|
| A | | 99.5 | | | 0.5 | | | | |
| B | | 98.0 | | | | 2 | | | |
| | 1 | 97.5 | | | 0.5 | 2 | | | |
| C | | 99 | | | 1 | | | | |
| | 2 | 97 | | | 1 | 2 | | | |
| D | | 74.5 | 25 | | 0.5 | | | | |
| | 3 | 72.5 | 25 | | 0.5 | 2 | | | |
| E | | 74.75 | 25 | | 0.25 | | | | |
| | 4 | 74.25 | 25 | | 0.25 | 0.5 | | | |
| F | | 74 | 25 | | | 1 | | | |
| | 5 | 72 | 25 | | | 1 | 2 | | |
| | 6 | 72 | 25 | | | 1 | | 2 | |
| | 7 | 72 | 25 | | | 1 | | | 2 | pH Stability of Gas Dehydration Compositions:

The pH stability for the dehydration compositions tested herein are determined by placing 12 grams of the dehydration composition to be tested into a 15 mL stainless steel sample bomb. The solutions are sealed under a nitrogen atmosphere and placed into an oven at 220° C. The extent of degradation is assessed by performing reserve alkalinity tests before and after aging at various point of time. The total alkalinity analysis is performed using an automatic titrator Mettler Toledo T90. The titration is performed using hydrochloric acid (HCl) purchased from Fisher Scientific at 0.5N concentration on a 10 g sample size. Total alkalinity is defined as the amount of HCl needed to titrate 10 g of analyte to pH 6.5. % Buffer consumption is defined as the percentage of pH buffer agent consumed and is calculated using the following equation: ([Total Alkalinity before aging]−[Total Alkalinity after aging])/[Total Alkalinity before aging]. The stability test results are shown in Table 2.

TABLE 2

| Com. Ex. | Ex. | Aging Time, Days | Total Alkalinity, Before Aging | Total Alkalinity, after Aging, average of 2 runs | % pH Buffer Consumption |
|---|---|---|---|---|---|
| A | | 7 | 0.67 | 0.3 | 54.61 |
| | | 14 | 0.67 | 0.14 | 78.39 |

TABLE 2-continued

| Com. Ex. | Ex. | Aging Time, Days | Total Alkalinity, Before Aging | Total Alkalinity, after Aging, average of 2 runs | % pH Buffer Consumption |
|---|---|---|---|---|---|
| | | 28 | 0.67 | 0.03 | 94.91 |
| B | | 7 | 0.00 | 0.00 | 100.00 |
| | | 14 | 0.00 | 0.00 | 100.00 |
| | | 28 | 0.00 | 0.00 | 100.00 |
| | 1 | 7 | 0.47 | 0.44 | 6.4 |
| | | 14 | 0.47 | 0.37 | 21.03 |
| | | 28 | 0.47 | 0.23 | 50.63 |
| C | | 7 | 1.3 | 0.77 | 41.14 |
| | | 14 | 1.3 | 0.49 | 62.16 |
| | | 28 | 1.3 | 0.13 | 89.74 |
| | 2 | 7 | 1.13 | 0.8 | 28.98 |
| | | 14 | 1.13 | 0.54 | 52.58 |
| | | 28 | 1.13 | 0.23 | 79.76 |
| D | | 7 | 0.51 | 0.43 | 16.55 |
| | | 14 | 0.51 | 0.41 | 19.99 |
| | | 28 | 0.51 | 0.34 | 33.71 |
| | 3 | 7 | 0.74 | 1.14 | −55.2 |
| | | 14 | 0.74 | 0.98 | −33.35 |
| | | 28 | 0.74 | 0.72 | 2.85 |
| E | | 7 | 0.29 | 0.23 | 20.55 |
| | | 14 | 0.29 | 0.2 | 31.86 |
| | | 28 | 0.29 | 0.16 | 44.02 |
| | 4 | 7 | 0.36 | 0.5 | −38.25 |
| | | 14 | 0.36 | 0.42 | −15.43 |
| | | 28 | 0.36 | 0.29 | 20.36 |
| F | | 7 | 0 | 0 | |
| | | 14 | 0 | 0 | |
| | | 28 | 0 | 0 | |
| | 5 | 7 | 0 | 2.64 | |
| | | 14 | 0 | 2.12 | |
| | | 28 | 0 | 1.78 | |
| | 6 | 7 | 0 | 0.32 | |
| | | 14 | 0 | 0.37 | |
| | | 28 | 0 | 0.14 | |
| | 7 | 7 | 0 | 0.32 | |
| | | 14 | 0 | 0.36 | |
| | | 28 | 0 | 0.42 | |

What is claimed is:

1. A gas dehydration composition comprising:
i from 60 to 99.9 weight percent of a glycol,
ii from 0.1 to 10 weight percent of a borate compound,
iii from 0.01 to 10 weight percent of an alkali metal carboxylate,
iv from 0 to 30 weight percent of an additional glycol different than i,
and
v from 0 to 25 weight percent of an additional additive selected from an alkanolamine, a phosphate acid or salt compound, a sweetening agent, a low temperature viscosity improver, a corrosion inhibitor, an antifoaming agent, or mixtures thereof
wherein weight percents are based on the total weight of the dehydration composition.

2. The gas dehydration composition of claim 1 wherein
i the glycol is monoethylene glycol, diethylene glycol, triethylene glycol, tetraethylene glycol, monopropylene glycol, dipropylene glycol, tripropylene glycol, tetrapropylene glycol, or glycerol,
ii the borate compound is boric acid, metaboric acid, sodium metaborate, tetraboric acid, sodium tetraborate, potassium tetraborate, their corresponding hydrates, or mixtures thereof,
iii the alkali metal salt is sodium acetate, potassium acetate, sodium formate, potassium formate, sodium bicarbonate, potassium bicarbonate, sodium glycolate, potassium glycolate, sodium lactate, potassium lactate, their corresponding hydrates, or mixtures thereof,
and
iv the additional glycol is the glycol is monoethylene glycol, diethylene glycol, triethylene glycol, tetraethylene glycol, monopropylene glycol, dipropylene glycol, tripropylene glycol, tetrapropylene glycol, glycerol, or mixtures thereof.

3. The gas dehydration composition of claim 1 wherein
i the glycol is triethylene glycol,
ii the borate compound is sodium tetraborate,
and
iii the alkali metal salt is sodium acetate.

4. The composition of claim 3 further comprising
iv glycerol in an amount from 0.1 to 30 weight percent.

5. A process for removing water from a gas comprising water using a gas dehydration composition comprising:
i from 60 to 99.9 weight percent of a glycol,
ii from 0.1 to 10 weight percent of a borate compound,
iii from 0.01 to 10 weight percent of an alkali metal carboxylate,
iv from 0 to 30 weight percent of an additional glycol different than i,
and
v from 0 to 25 weight percent of an additional additive selected from an alkanolamine, a phosphate acid or salt compound, a sweetening agent, a low temperature viscosity improver, a corrosion inhibitor, an antifoaming agent, or mixtures thereof
wherein weight percents are based on the total weight of the dehydration composition.

6. The process of claim 5 wherein
i the glycol is monoethylene glycol, diethylene glycol, triethylene glycol, tetraethylene glycol, monopropylene glycol, dipropylene glycol, tripropylene glycol, tetrapropylene glycol, or glycerol,
ii the borate compound is boric acid, metaboric acid, sodium metaborate, tetraboric acid, sodium tetraborate, potassium tetraborate, their corresponding hydrates, or mixtures thereof,
iii the alkali metal salt is sodium acetate, potassium acetate, sodium formate, potassium formate, sodium bicarbonate, potassium bicarbonate, sodium glycolate, potassium glycolate, sodium lactate, potassium lactate, their corresponding hydrates, or mixtures thereof,
iv the additional glycol is monoethylene glycol, diethylene glycol, triethylene glycol, tetraethylene glycol, monopropylene glycol, dipropylene glycol, tripropylene glycol, tetrapropylene glycol, glycerol, or mixtures thereof.

7. The process of claim 6 wherein
i the glycol is triethylene glycol,
ii the borate compound is sodium tetraborate,
and
iii the alkali metal salt is sodium acetate.

8. The process of claim 7 wherein the gas dehydration composition further comprises
iv glycerol in an amount from 0.1 to 30 weight percent.

9. The process of claim 5 wherein the gas is natural gas.

10. The process of claim 5 comprising the step of:
a contacting said gas in a continuous counter current contact zone with said dehydrating composition to form a water-rich dehydrating composition.

11. The process of claim 10 further comprising the step of:
b regenerating said water-rich dehydration composition at a temperature of 120° C. to 225° C. to form a lean dehydration composition
and c using all or part of the regenerated lean dehydration composition, repeat step a.

\* \* \* \* \*